(12) United States Patent
Jeong et al.

(10) Patent No.: US 8,241,935 B2
(45) Date of Patent: Aug. 14, 2012

(54) METHOD OF FABRICATING LIQUID CRYSTAL DISPLAY DEVICE HAVING CONCAVE REFLECTOR

(75) Inventors: Woo-Nam Jeong, Kyongsangbuk-do (KR); Hye-Young Kim, Daejeon-kwangyokshi (KR); Joo-Soo Lim, Kyongsangbuk-do (KR); Won-Seok Kang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/732,274

(22) Filed: Dec. 11, 2003

(65) Prior Publication Data

US 2004/0125288 A1 Jul. 1, 2004

(30) Foreign Application Priority Data

Dec. 31, 2002 (KR) .......................... 10-2003-0000393

(51) Int. Cl.
*H01L 21/00* (2006.01)

(52) U.S. Cl. .......... 438/30; 438/149; 349/113; 349/187; 257/E21.001

(58) Field of Classification Search .................... 438/30, 438/149; 349/113, 138
See application file for complete search history.

(56) References Cited

U.S. PATENT DOCUMENTS

| | | | | |
|---|---|---|---|---|
| 4,106,859 A | * | 8/1978 | Doriguzzi et al. | 349/113 |
| 5,408,345 A | * | 4/1995 | Mitsui et al. | 349/42 |
| 6,069,674 A | | 5/2000 | Aomori et al. | |
| 6,208,395 B1 | * | 3/2001 | Kanoh et al. | 349/113 |
| 6,720,577 B2 | * | 4/2004 | Arao et al. | 257/59 |
| 6,815,239 B1 | | 11/2004 | Kong et al. | |
| 6,954,244 B2 | * | 10/2005 | Jeon et al. | 349/113 |
| 6,985,193 B2 | * | 1/2006 | Jang | 349/43 |
| 7,106,400 B1 | * | 9/2006 | Tsuda et al. | 349/113 |
| 2002/0033917 A1 | | 3/2002 | Hoshino | |
| 2002/0054257 A1 | | 5/2002 | Tanada et al. | |
| 2002/0167278 A1 | * | 11/2002 | Yoon | 315/169.3 |
| 2002/0176029 A1 | * | 11/2002 | Fujino | 349/43 |
| 2003/0086046 A1 | * | 5/2003 | You | 349/149 |
| 2004/0144754 A1 | * | 7/2004 | Itami et al. | 216/62 |
| 2006/0011912 A1 | * | 1/2006 | Park et al. | 257/59 |

FOREIGN PATENT DOCUMENTS

| | | |
|---|---|---|
| JP | 03-042626 | 2/1991 |
| JP | 09-043627 | 2/1997 |
| JP | 11-194338 | 7/1999 |
| JP | 11-305221 | 11/1999 |
| JP | 2000-089217 | 3/2000 |
| JP | 2000-187208 | 7/2000 |
| JP | 2000-258615 | 9/2000 |
| JP | 2000-314894 | 11/2000 |
| JP | 2001-188112 | 7/2001 |
| JP | 2002-090729 | 3/2002 |
| JP | 2002-090730 | 3/2002 |
| JP | 2002-162645 | 6/2002 |
| JP | 2002-229060 | 8/2002 |

* cited by examiner

*Primary Examiner* — Thanh Nguyen
(74) *Attorney, Agent, or Firm* — Morgan, Lewis & Bockius LLP (57) ABSTRACT

A method of fabricating a liquid crystal display device having a concave reflector includes forming a switching element on a substrate, the switching element comprising a gate electrode, a semiconductor layer, a source electrode, and a drain electrode, forming a first insulating layer on the substrate including the switching element, forming a plurality of photoresist patterns on the first insulating layer, patterning the first insulating layer to have a concave surface by using the photoresist patterns as masks, and forming a reflector on the first insulating layer having the recessed uneven surface.

18 Claims, 10 Drawing Sheets

METHOD OF FABRICATING LIQUID CRYSTAL DISPLAY DEVICE HAVING CONCAVE REFLECTOR

This application claims the benefit of the Korean Patent Application No. P2003-000393 filed on Dec. 31, 2002, which is hereby incorporated by reference.

BACKGROUND OF THE INVENTION

1. Field of the Invention

The present invention relates to a liquid crystal display device, and more particularly, to a method of fabricating a liquid crystal display device having a concave reflector. Although the present invention is suitable for a wide scope of applications, it is particularly suitable for improving reflexibility of the reflector in the liquid crystal display device.

2. Discussion of the Related Art

Flat panel display devices, which have characteristics of being thin and light weight, and consuming low power, have been required as the information age rapidly evolves. The flat panel display devices may be classified into two types depending on how the light is emitted. One is a light-emitting type display device that emits the light by itself to display images, and the other is a light-receiving display device that uses an external light source to display images. A plasma display panel (PDP) device, a field emission display (FED) device, and an electroluminescent (EL) display device are examples of the light-emitting type display device, and a liquid crystal display (LCD) device is an example of the light-receiving type display device. The liquid crystal display device is widely used for notebook computers and desktop monitors, etc. because of its superior resolution, color image display, and quality of displayed images.

Generally, the liquid crystal display device has first and second substrates, which are spaced apart and face into each other. Each of the substrates includes an electrode, and the electrodes of each substrate are positioned to face into each other. A liquid crystal layer is interposed between the first substrate and the second substrate. A voltage is applied to the electrodes of each substrate, and thus the alignment of the liquid crystal molecules is changed according to the voltage applied to display images. Because the liquid crystal display device cannot emit the light as described above, it needs an additional light source to display images.

Therefore, a color image may be displayed by irradiating artificial light from a backlight, which is positioned behind the liquid crystal panel, to the liquid crystal layer and then controlling the amount of the light according to the alignment of the liquid crystal. At this time, the electrodes are formed of a transparent conductive material and the substrates are transparent. This liquid crystal display (LCD) device is commonly referred to as a transmissive LCD device. Because the transmissive LCD device uses an external light source such as a backlight, it can display a bright image in the dark surroundings but it has a high power consumption.

To solve this problem, a reflective LCD device has been proposed and developed. The reflective LCD device displays a color image by controlling a transmittance of the light according to the alignment of the liquid crystal molecules by reflecting ambient light or external light. The reflective LCD device depends on ambient light or an external light source for its light source and accordingly it has a lower power consumption than the transmissive liquid crystal display device. In the reflective LCD device, the lower electrode may be formed of a material that reflects light well, and the upper electrode may be formed of a transparent conductive material.

Figure 1:
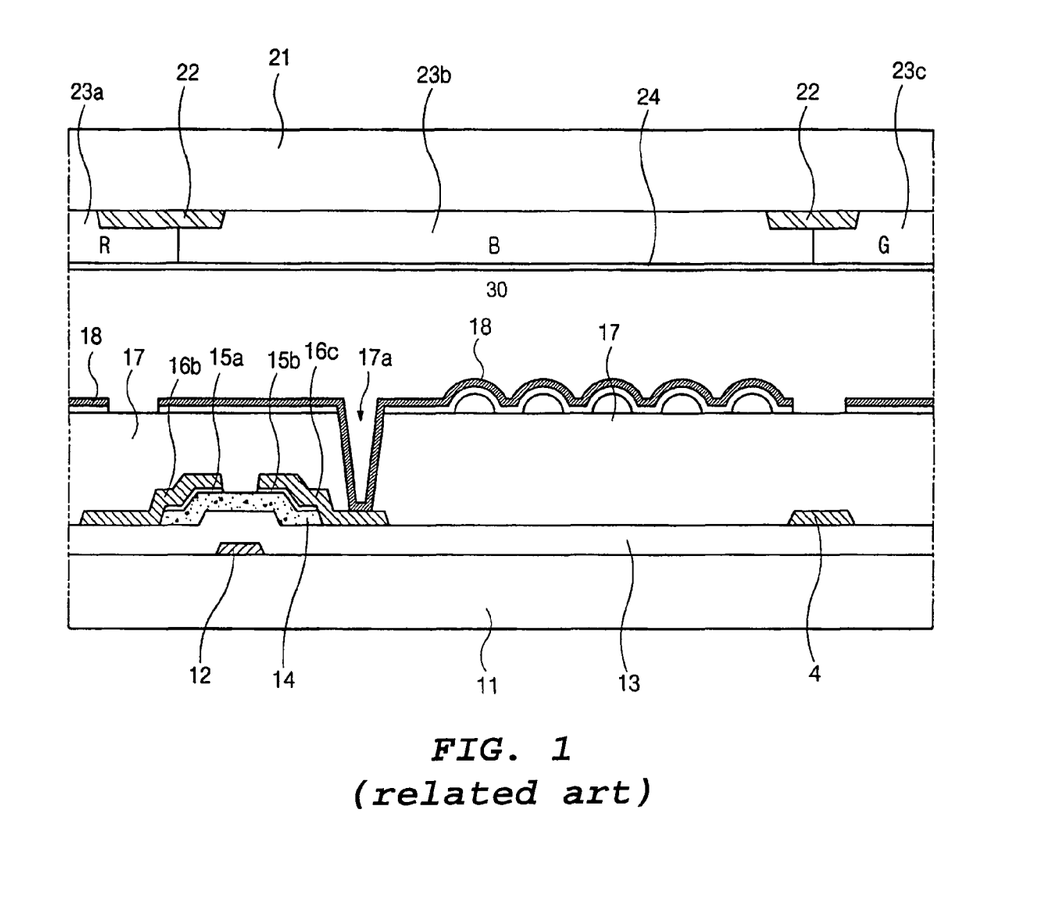
FIG. 1 is a schematic cross-sectional view of a reflective liquid crystal display device according to the related art.

FIG. 1 is a schematic cross-sectional view of a reflective liquid crystal display device according to the related art.

In FIG. 1, first and second substrates 11 and 21 are spaced apart from each other. A gate electrode 12 is formed on the inner surface of the first substrate 11, and a gate insulating layer 13 is formed on the gate electrode 12. A gate line (not shown), which is connected to the gate electrode 12, is also formed between the first substrate 11 and the gate insulating layer 13. An active layer 14 and an ohmic contact layer 15a and 15b are subsequently formed on the gate insulating layer 13 over the gate electrode 12. Source and drain electrodes 16b and 16c are formed on the ohmic contact layer 15a and 15b, and the source and drain electrodes 16b and 16c form a thin film transistor having the gate electrode 12. A data line 4, which may be formed of the same material as the source and drain electrodes 16b and 16c, is formed on the gate insulating layer 13. The data line 4 is connected to the source electrode 16b and crosses the gate line, thereby defining a pixel area.

A passivation layer 17, which may be formed of an organic material, is formed on the source and drain electrodes 16b and 16c. The passivation layer 17 covers the thin film transistor and has a contact hole 17a exposing a portion of the drain electrode 16c. A reflective electrode 18, which may function as a pixel electrode, is formed on the passivation layer 17 at the pixel area. The reflective electrode 18 is connected to the drain electrode 16c through the contact hole 17a. Here, the reflective electrode 18 is formed of a conductive material such as a metallic material and has an undulating surface for diffusing light in order to increase reflectance at effective viewing angles for a user. The reflective electrode 18 covers the thin film transistor and overlaps the data line 4 to increase an aperture ratio of the device. At this time, the passivation layer 17 may be formed of an organic material having a relatively low dielectric constant so as to prevent signals of the reflective electrode 18 and the data line 4 from interfering each other.

Meanwhile, a black matrix 22 is formed on the inner surface of the second substrate 21, and a color filter layer 23a, 23b, and 23c having three colors of red (R), green (G), and blue (B) is formed on the black matrix 22. A common electrode 24 of a transparent conductive material is formed on the color filter layer 23a, 23b, and 23c. Each color of the color filter layer 23a, 23b, and 23c corresponds to each reflective electrode 18, and the black matrix 22 is disposed to the corresponding edges of the reflective electrode 18. As stated above, since the reflective electrode 18 of an opaque conductive material such as metal covers the thin film transistor, the black matrix 22 can cover only the edges of the reflective electrode 18.

A liquid crystal layer 30 is interposed between the reflective electrode 18 and the common electrode 24. When a voltage is applied to the reflective electrode 18 and the common electrode 24, liquid crystal molecules of the liquid crystal layer 30 are arranged by an electric field induced between the reflective electrode 18 and the common electrode 24. Although not shown in the drawing, alignment layers are formed on the reflective electrode 18 and the common electrode 24, respectively, to arrange the liquid crystal molecules of the liquid crystal material layer 30.

In the reflective liquid crystal display device, images are displayed by reflecting light from the outside at the reflective electrode, which is formed with a material that reflects light well. Accordingly, the reflective liquid crystal display device may be used for a long period of time with a limited power due to a low power consumption.

In addition, since the passivation layer 17 has an undulated surface, the reflective electrode 18 also has an undulated surface. The undulated surface changes a reflected angle of light to increase brightness at the front side.

A manufacturing process of an array substrate for a reflective liquid crystal display device according to the related art will be described with reference to the accompanying drawings. Here, since the process steps up to the source and drain electrodes are equal to the manufacturing process of a conventional liquid crystal display device, detailed descriptions are omitted for simplicity.

FIGS. 2A to 2F are cross-sectional views showing the manufacturing process of an array substrate for a reflective liquid crystal display device according to the related art.

Figure 2A:
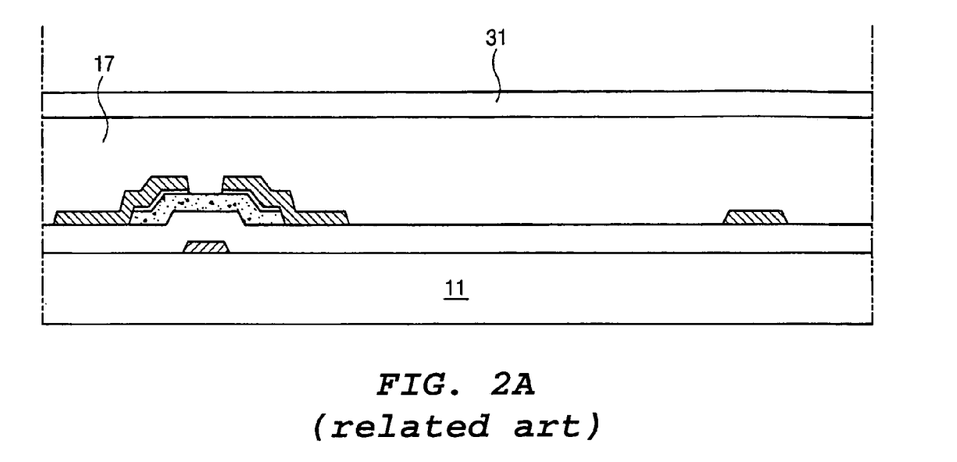
FIGS. 2A to 2F are cross-sectional views showing the manufacturing process of an array substrate for a reflective liquid crystal display device according to the related art.

In FIG. 2A, a thin film transistor and a passivation layer 17 are formed on a substrate 11, and a first organic layer 31 is formed on the passivation layer 17 by coating an organic material. The organic material may be a photosensitive material, such as photo-acryl. The photosensitive material does not require an additional photoresist for patterning.

Figure 2B:
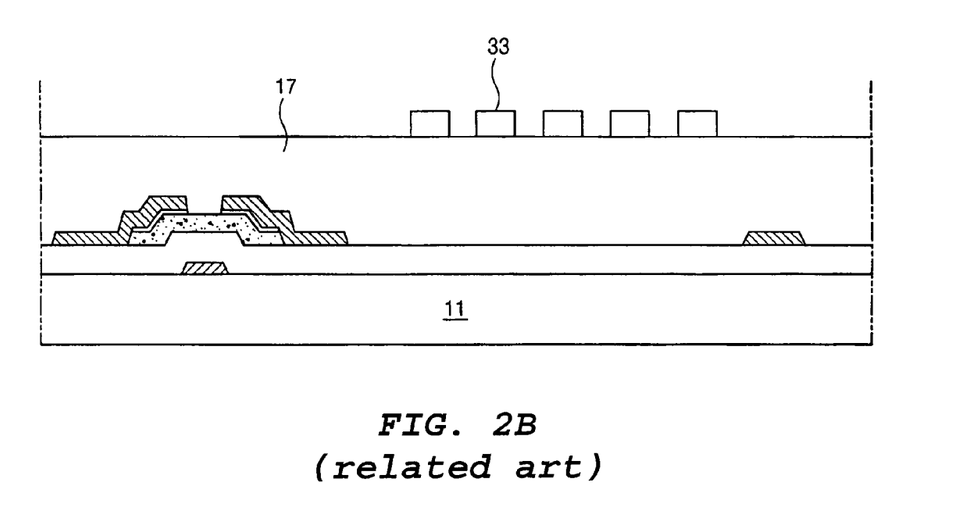

In FIG. 2B, the first organic layer 31 of FIG. 2A is exposed to light with a mask and is then developed to form organic patterns 33 having a definite size and a regular interval therebetween. At this time, a slanting angle of an uneven surface to be formed in a later process may be controlled by adjusting a space or overlap between the organic patterns 33. A portion of the organic material exposed to light may be removed. Alternatively, an exposed portion may be removed.

Figure 2C:
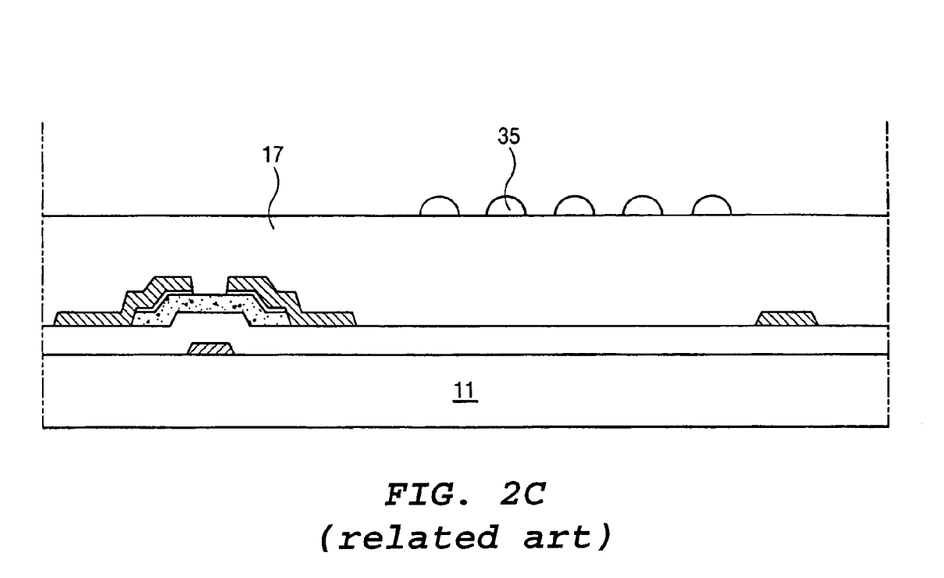

In FIG. 2C, the organic patterns 33 of FIG. 2B are annealed to form undulated organic patterns 35. At this time, the undulated organic patterns 35 are melted by annealing and are spread on passivation layer 17. Next, the undulated organic patterns 35 are hardened so as to have a slanting angle and to be slowly curved.

Figure 2D:
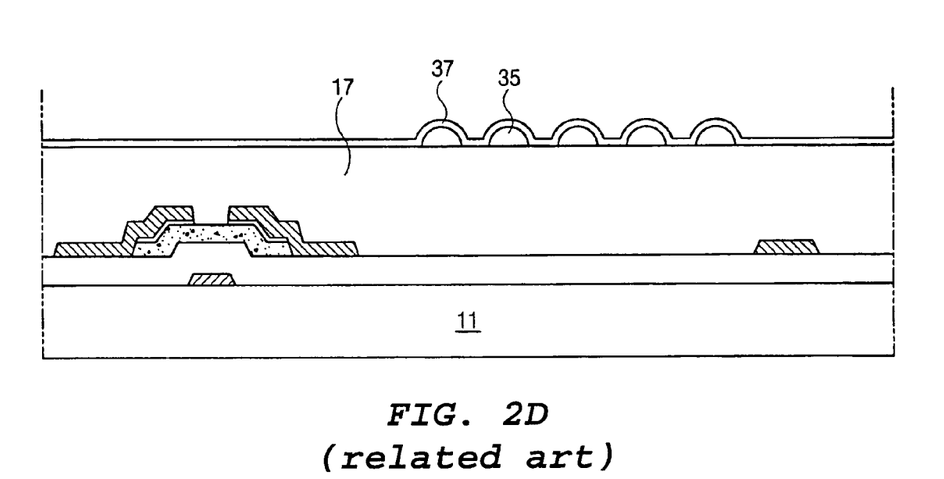

In FIG. 2D, a second organic layer 37 is formed on the entire surface of the passivation layer 17 including the undulated organic patterns 35 thereon by coating an organic material. Here, the side surface of the second organic layer 37 may be adjusted due to the undulated organic patterns 35, and the surface of the second organic layer 37 may be curved having an inclined angle.

Figure 2E:
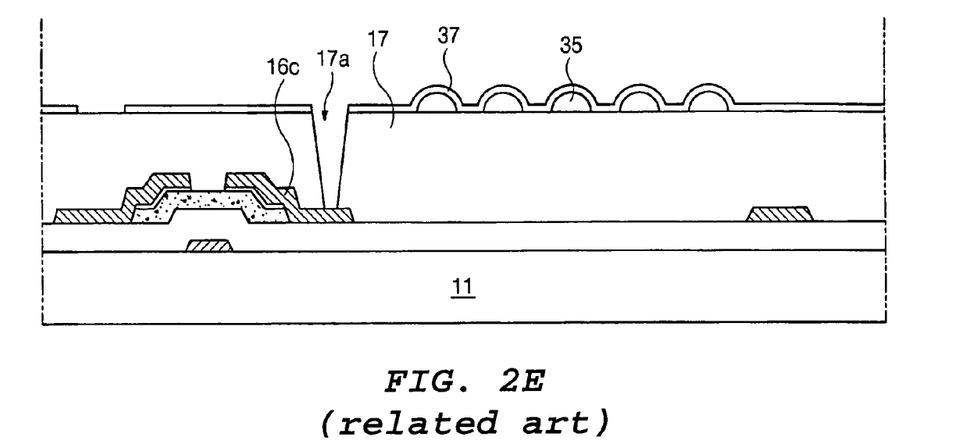

In FIG. 2E, a drain contact hole 17a is formed by patterning the passivation layer 17 and the second organic layer 37 using a mask. The drain contact hole 17a exposes a portion of a drain electrode 16c.

Figure 2F:
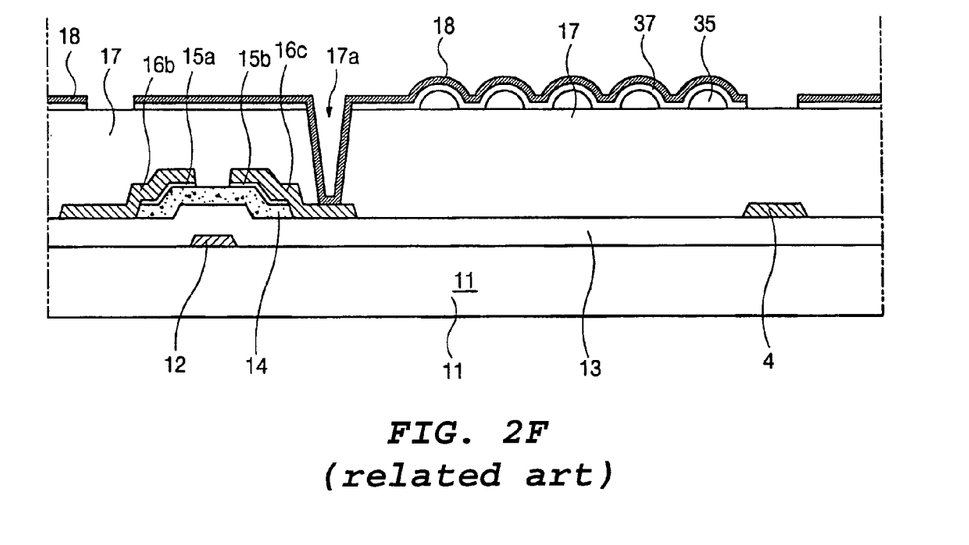

In FIG. 2F, a reflector 18 is formed on the second organic layer 37 in a pixel area using a mask. The reflector 18 has an undulated surface due to the undulated organic patterns 35 and functions as a reflective electrode that reflects light and drives liquid crystal molecules.

In the convex reflector formed by the above-mentioned method, the uneven surface is formed of photo-acryl, which is a photosensitive resin. However, the photo-acryl is not used in the transmissive liquid crystal display device, and thus, the uneven surface of the reflective liquid crystal display device cannot be formed using the existing equipment. More specifically, since the photo-acryl uses a developer different from other organic materials, an investment in equipment for new developing line is required.

SUMMARY OF THE INVENTION

Accordingly, the present invention is directed to a method of fabricating a liquid crystal display device having a concave reflector that substantially obviates one or more problems due to limitations and disadvantages of the related art.

Another object of the present invention is to provide a method of fabricating a liquid crystal display device having a concave reflector that provides a high reflectivity.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes forming a switching element on a substrate, the switching element comprising a gate electrode, a semiconductor layer, a source electrode, and a drain electrode, forming a first insulating layer on the substrate including the switching element, forming a plurality of photoresist patterns on the first insulating layer, patterning the first insulating layer to have a concave surface by using the photoresist patterns as masks, and forming a reflector on the first insulating layer having the recessed uneven surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 3:
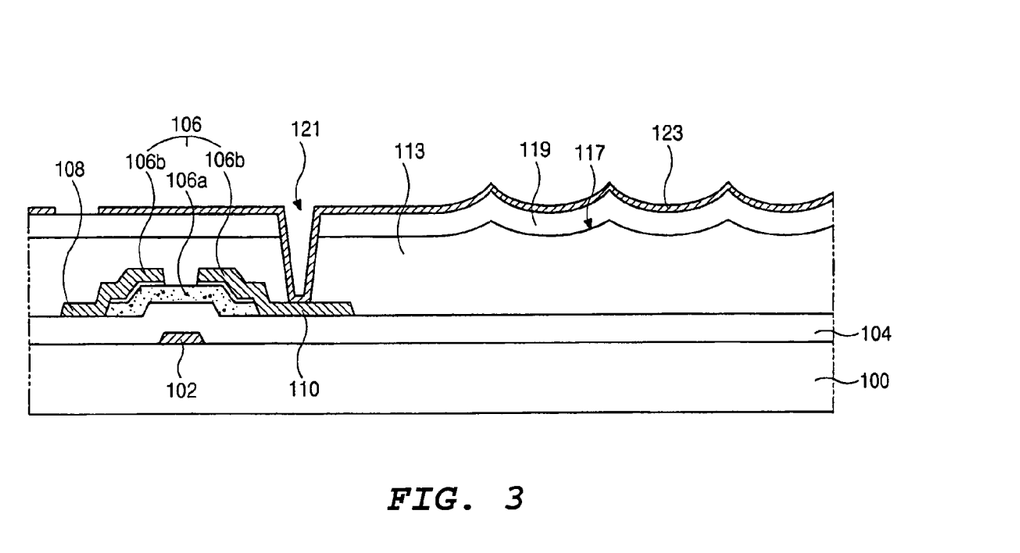
FIG. 3 is a cross-sectional view of an array substrate for a reflective liquid crystal display device according to a first embodiment of the present invention.

FIG. 3 is a cross-sectional view of an array substrate for a reflective liquid crystal display device according to a first embodiment of the present invention. In the first embodiment, a reflector having an undulated surface is formed of benzocyclobutene (BCB).

In FIG. 3, a thin film transistor, which includes a gate electrode 102, a semiconductor layer 106, a source electrode 108, and a drain electrode 110, is formed on a substrate 100 as a switching element. A first organic layer 113 is formed over the entire surface of the substrate 100 covering the thin film transistor. The first organic layer 113 has a recessed or concave uneven surface 117 which may be spherical and smooth. A second organic layer 119 is formed on the first organic layer 113. The first and second organic layers 113 and 119 have a drain contact hole 121 exposing a portion of the drain electrode 110. A reflector 123 is formed on the second organic layer 119 and is connected to the drain electrode 110 through the drain contact hole 121. The reflector 123 functions as a reflective electrode.

FIGS. 4A to 4D are cross-sectional views showing the manufacturing process of an array substrate for a reflective liquid crystal display device according to the first embodiment of the present invention.

Figure 4A:
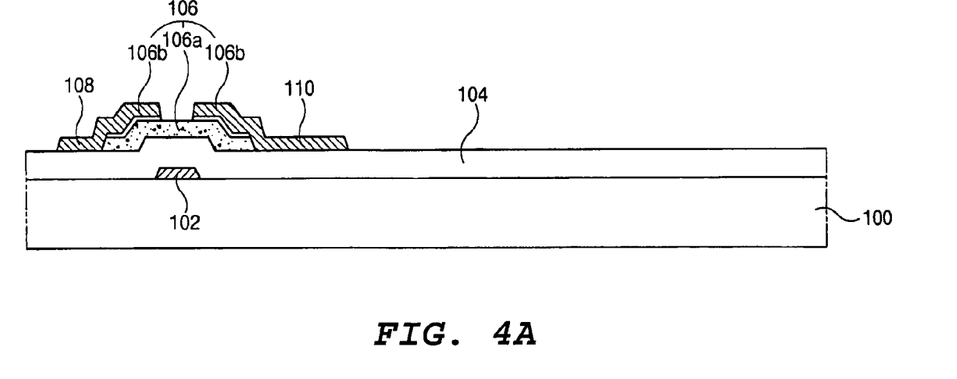
FIGS. 4A to 4D are cross-sectional views showing the manufacturing process of an array substrate for a reflective liquid crystal display device according to the first embodiment of the present invention.

In FIG. 4A, a gate electrode 102 is formed on a substrate 100 by depositing a metallic material, such as chromium (Cr), copper (Cu), and aluminum (Al), coating a photoresist on the metallic material, exposing the photoresist through a mask that has a gate electrode pattern, developing the photoresist, and then etching the metallic material. A gate insulating layer 104 is formed on the entire surface of the substrate 100 including the gate electrode 102. The gate insulating layer 104 may be formed of one of silicon nitride (SiNx) and silicon oxide ($SiO_2$).

Next, a semiconductor layer 106 including an active layer 106a of amorphous silicon and an ohmic contact layer 106b of doped amorphous silicon is formed on the gate insulating layer 104 over the gate electrode 102. Here, the active layer 106a may be formed by depositing and patterning an amorphous silicon layer, and the ohmic contact layer 106b may be formed by doping phosphorus (P) or boron (B) into the active layer 106a.

A source electrode 108 and a drain electrode 110 are formed on the ohmic contact layer 106b by depositing a metallic material and patterning it through a mask process. At this time, after the source and drain electrodes 108 and 110 are formed, the ohmic contact layer 106b between the source and drain electrodes 108 and 110 is removed by using the source and drain electrodes 108 and 110 as a mask to expose the active layer 106a.

Figure 4B:
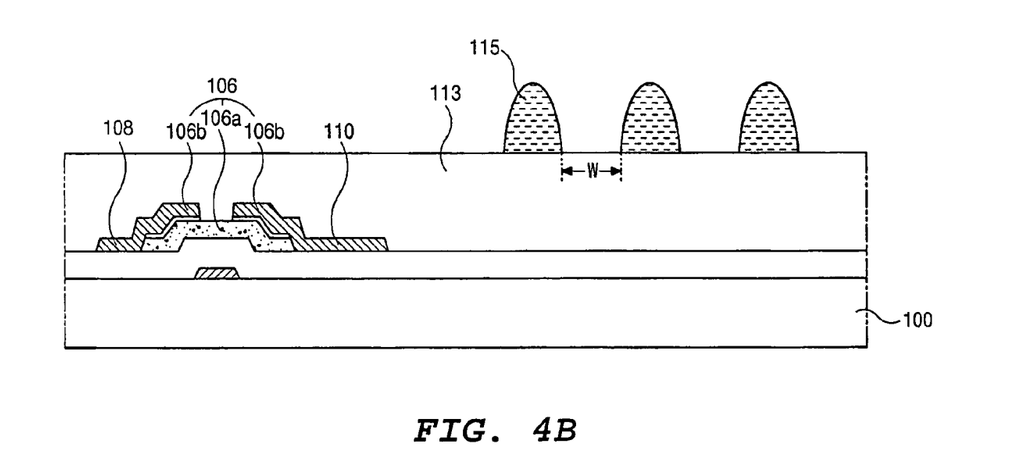

In FIG. 4B, a first organic layer 113 is formed on the entire surface of the substrate 100 including the source and drain electrodes 108 and 110 by coating an organic material, such as benzocyclobutene (BCB). Next, photoresist patterns 115 are formed on the first organic layer 113 by coating a photoresist, exposing and developing the photoresist through a mask process. The photoresist patterns 115 may have a cross-section of a polygon, such as a pentagon, a hexagon, and a trapezoid, and a semi-circle or a semi-ellipsoid. The photoresist patterns 115 have a regular space W therebetween, and the space W is within the range of about 4 micrometers (μm) to about 30 micrometers (μm). A size of the photoresist patterns 115 and the space W between the photoresist patterns 115 may be designed by considering that the size and the space W may be changed from the planned values due to a critical dimension (CD) loss of about 1 micrometer (μm) from side to side.

Figure 4C:
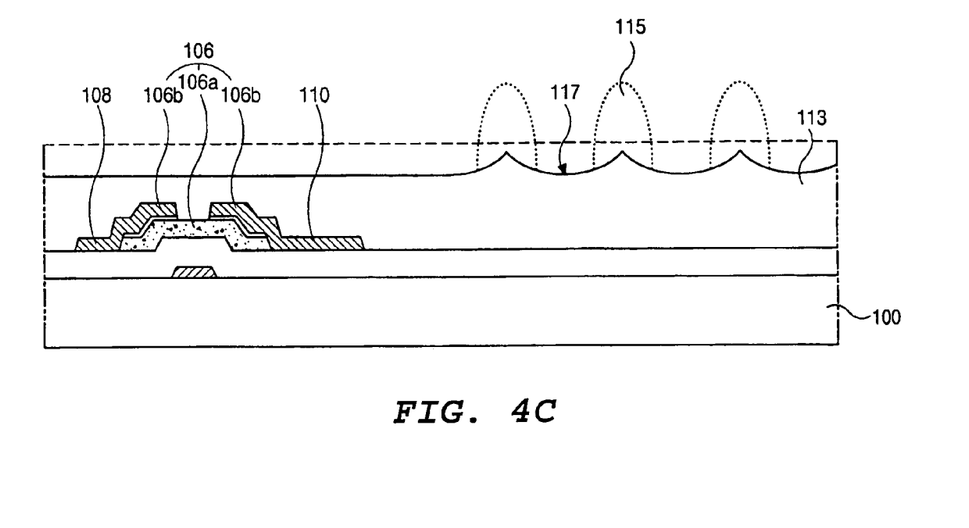

In FIG. 4C, the first organic layer 113 and the photoresist patterns 115 are etched at the same time by performing a dry-etching process on the substrate 100 including the photoresist patterns 115, and then a recessed or concave uneven surface 117, which has a plurality of dimples at the surface of the first organic layer 113 corresponding to the photoresist patterns 115, is formed. The first organic layer 113 may have a flat surface over the source and drain electrodes 108 and 110. Here, the first organic layer 113 and the photoresist patterns 115 are dry-etched vertically and horizontally. Thus, each dimple of the uneven surface 117 may have a width within the range of about 8 micrometers (μm) to about 34 micrometers (μm) by controlling a thickness of the photoresist patterns 115. Additionally, in the dimple of the uneven surface 117, a depth and a width may have a ratio of about 1 to 10 to about 1 to 30. A thickness of the remaining first organic layer 113 may be about 0.7 micrometers (μm). At this time, an etching selectivity of the photoresist patterns 115 and the first organic layer 113 may be adjusted by controlling conditions of the dry-etching process.

Figure 4D:
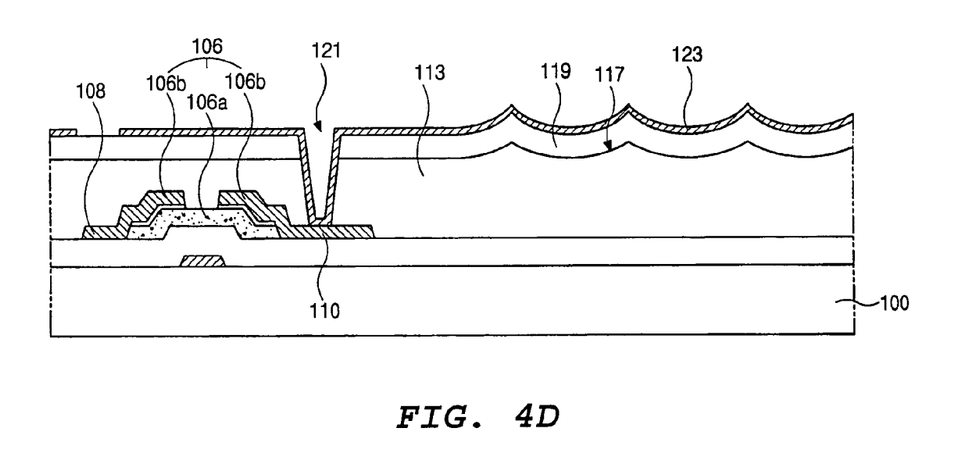

In FIG. 4D, a second organic layer 119 is formed on the first organic layer 113 having the uneven surface 117 by coating benzocyclobutene (BCB) or acryl resin, and then is patterned with the first organic layer 113 through a mask process to form a drain contact hole 121 exposing a portion of the drain electrode 110. Next, a reflector 123 is formed on the second organic layer 119. The reflector 123 is connected to the drain electrode 110 through the drain contact hole 121 and functions as a reflective electrode. The reflector 123 and the second organic layer 119 also have undulated surfaces due to the uneven surface 117 of the first organic layer 113.

Here, the reflective liquid crystal display device may include an inorganic layer in place of the second organic layer 119 formed of an organic material, such as benzocyclobutene (BCB).

Figure 5:
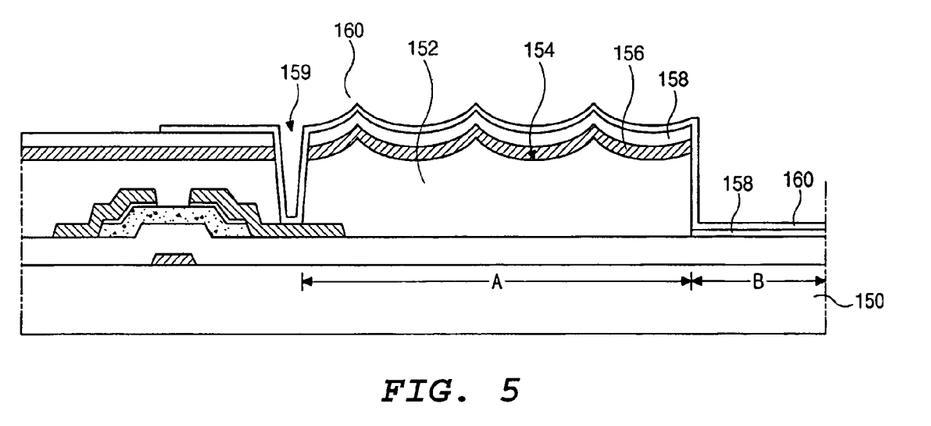
FIG. 5 is a cross-sectional view of an array substrate for a transflective liquid crystal display device according to the first embodiment of the present invention.

The first embodiment of the present invention may be applied to a transflective liquid crystal display device, which also has a reflector and is used both in a transmissive mode and in a reflective mode. FIG. 5 is a cross-sectional view of an array substrate for a transflective liquid crystal display device according to the first embodiment of the present invention. The array substrate for the transflective liquid crystal display device is fabricated through the same manufacturing process as the array substrate for the reflective liquid crystal display device shown in FIGS. 4A to 4D, and thus detailed descriptions for the manufacturing process are omitted for simplicity.

As illustrated in FIG. 5, a thin film transistor is formed on a substrate 150 having a reflective portion A and a transmissive portion B, and a first insulating layer 152 is formed on the thin film transistor. The first insulating layer 152 has a recessed or concave uneven surface 154 and is removed at the transmissive portion B in order to improve brightness at the transmissive portion B. A reflector 156 is formed on the first insulating layer 152 at the reflective portion A. The first insulating layer 152 may be formed of an organic insulating material. A second insulating layer 158, which may be formed of an inorganic insulating material, is formed not only on the reflector 156 at the reflective portion A but also at the transmissive portion B. The second insulating layer 158 has a contact hole 159 exposing a portion of the thin film transistor (i.e., a drain electrode) through the reflector 156 and the first insulating layer 152. A pixel electrode 160 is formed on the second insulating layer 158 by depositing a transparent conductive material, such as indium tin oxide (ITO) and indium zinc oxide (IZO), and is connected to the drain electrode through the contact hole 159.

In the reflective or transflective liquid crystal display device according to the first embodiment, the recessed or concave uneven surface including the dimples, which is to achieve more effective viewing angles and has excellent reflectance, is formed by using benzocyclobutene (BCB). BCB has been used in the conventional liquid crystal display device. Therefore, the reflective or transflective liquid crystal display device can be fabricated by using the existing facilities. In addition, the repressed or concave uneven surface improves reflectance as compared with a convex uneven surface formed by using photo-acryl.

In the first embodiment, although the recessed or concave uneven surface is formed by dry-etching benzocyclobutene (BCB), the recessed or concave uneven surface may be formed by using an inorganic insulating layer, such as silicon nitride.

FIGS. 6A to 6D illustrate the manufacturing process of an array substrate for a reflective liquid crystal display device according to a second embodiment of the present invention. In the second embodiment, an uneven surface is formed by wet-etching silicon nitride.

Figure 6A:
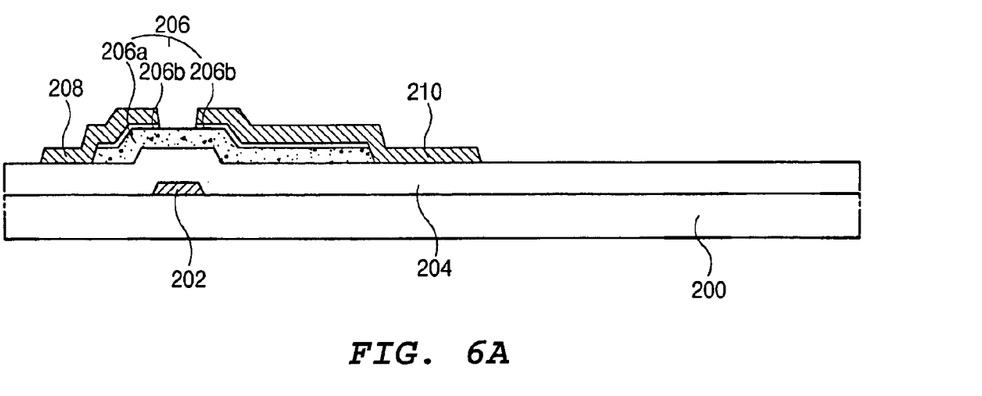
FIGS. 6A to 6D illustrate the manufacturing process of an array substrate for a reflective liquid crystal display device according to a second embodiment of the present invention.

As shown in FIG. 6A, a gate electrode 202 is formed on a substrate 200, and a gate insulating layer 204 is formed on the entire surface of the substrate 200 including the gate electrode 202. A semiconductor layer 206, which includes an active layer 206a and an ohmic contact layer 206b, is formed on the gate insulating layer 204 over the gate electrode 202. A source electrode 208 and a drain electrode 210 are formed on the ohmic contact layer 206b. The gate electrode 202, the semiconductor layer 206, and the source and drain electrodes 208 and 210 constitute a thin film transistor.

Figure 6B:
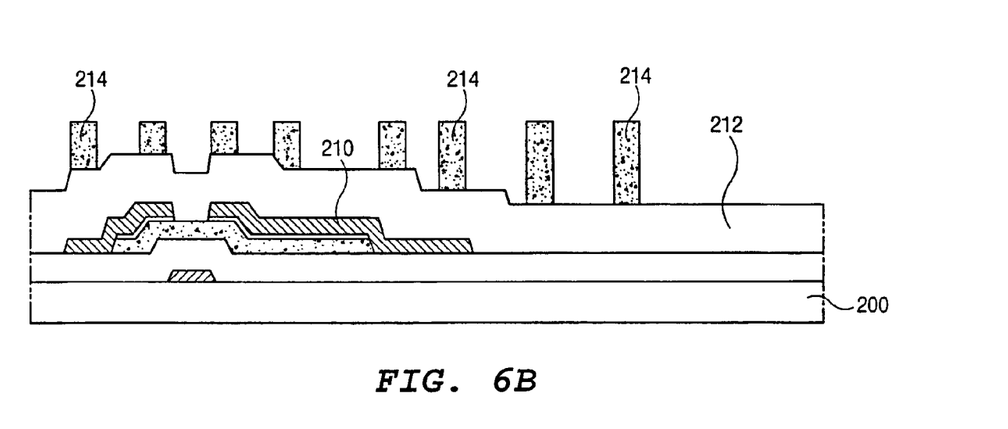

Next, as shown in FIG. 6B, an inorganic layer 212, which may be formed of silicon nitride, is formed on the entire surface of the substrate 200 including the source and drain electrodes 208 and 210. Photoresist patterns 214 are formed on the inorganic layer 212 by coating a photoresist, and exposing and developing the photoresist through a mask process using a mask. The mask may include a plurality of columns, wherein the columns may have a size in the range of about 2 micrometers (μm) to about 20 micrometers (μm), and a space between the columns may be in the range of about 1 micrometer (μm) to about 2 micrometers (μm). The columns may have one of various shapes, such as a circle, an ellipsoid, and a hexagon. Meanwhile, the inorganic layer 212 may be formed of silicon oxide.

Figure 6C:
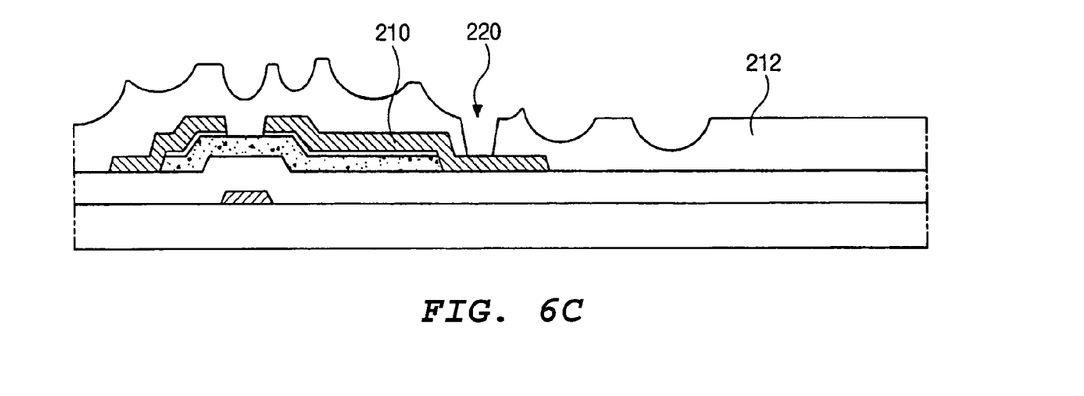

As shown in FIG. 6C, the inorganic layer 212 is etched by performing a wet-etching process on the substrate 200 including the photoresist patterns 214 of FIG. 6B. At this time, since the inorganic layer 212 under the photoresist patterns 214 is also etched from the lateral sides, a recessed or concave uneven surface, which has a plurality of dimples, is formed at the surface of the inorganic layer 212 by controlling wet-etching conditions.

Figure 6D:
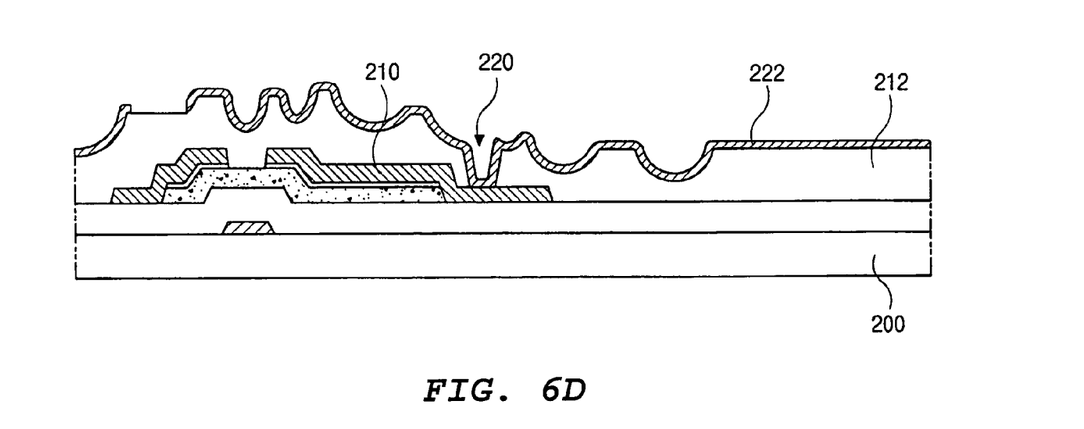

As shown in FIG. 6D, a drain contact hole 220 exposing a portion of the drain electrode 210 is formed by performing a mask process on the inorganic layer 212 including the recessed or concave uneven surface. A reflective electrode 222 is formed on the inorganic layer 212 including the recessed or concave uneven surface. The reflective electrode 222 is connected to the drain electrode 210 through the drain contact hole 220.

In the second embodiment, an organic layer may be formed on the source and drain electrodes before forming the inorganic layer of silicon nitride. That is, the organic layer is formed on the source and drain electrodes, and the inorganic layer is formed on the organic layer. Next, the recessed or concave uneven surface is formed at the surface of the inorganic layer through a wet-etching process.

Although it is not shown in the drawings, in a transflective liquid crystal display device, a reflector may be formed on the inorganic layer having the recessed or concave uneven surface. Other inorganic layer may be further formed on the reflector and a transmissive electrode, which is connected to the drain electrode through the drain contact hole, is formed on the other inorganic layer.

Consequently, the method of fabricating the liquid crystal display device having a concave reflector according to the present invention has several advantages as follows.

Since a recessed or concave uneven surface including a plurality of dimples is formed by using benzocyclobutene (BCB), which is commonly used as a passivation layer in a liquid crystal display device, or silicon nitride, the existing facilities can be used in manufacturing the reflective or transflective liquid crystal display device. In addition, the recessed or concave uneven structure provides better reflectance than a convex uneven structure.

It will be apparent to those skilled in the art that various modifications and variations can be made in the method of fabricating the liquid crystal display device having a concave reflector of the present invention without departing from the spirit or scope of the inventions. Thus, it is intended that the present invention covers the modifications and variations of this invention provided they come within the scope of the appended claims and their equivalents.

What is claimed is:

1. A method of fabricating a liquid crystal display device, comprising:
   forming a switching element on a substrate, the switching element comprising a gate electrode, a semiconductor layer, a source electrode, and a drain electrode;
   forming a first insulating layer on the substrate including the switching element;
   forming a plurality of photoresist patterns on the first insulating layer, wherein the plurality of photoresist patterns are spaced apart from each other;
   etching the first insulating layer and the plurality of photoresist patterns to form a plurality of concave portions directly adjacent to each other by using the photoresist patterns as masks, wherein the plurality of photoresist patterns are removed in the etching, whereby each concave portion has an entirely smoothly curved top surface in cross-section, and a portion, where the concave portions directly adjacent to each other of the first insulating layer meet each other, has a upwardly sharp point in cross-section, and the upwardly sharp point corresponds to each center of the plurality of photoresist patterns in cross-section; and
   forming a reflector on the first insulating layer and having a plurality of concave portions directly adjacent to each other, each of which has an entirely smoothly curved top surface in cross-section, due to the plurality of concave portions of the first insulating layer, whereby a portion, where the concave portions directly adjacent to each other of the reflector meet each other, has a upwardly sharp point in cross-section,
   wherein each of a portion of the first insulating layer and a portion of the reflector, which are over the switching element, has a flat top surface.

2. The method according to claim 1, wherein the first insulating layer is formed of an organic material.

3. The method according to claim 2, wherein the organic material includes benzocyclobutene (BCB).

4. The method according to claim 3, wherein the patterning the first insulating layer is performed by a dry-etching method.

5. The method according to claim 1, wherein the first insulating layer is formed of an inorganic material.

6. The method according to claim 5, wherein the first insulating layer is formed of one of silicon nitride and silicon oxide.

7. The method according to claim 6, wherein the first insulating layer is patterned by a wet-etching method.

8. The method according to claim 5, further comprising forming a second insulating layer between the switching element and the first insulating layer, the second insulating layer including benzocyclobutene (BCB).

9. The method according to claim 1, wherein the photoresist patterns are spaced apart from one another in a range of about 4 micrometers (μm) to 30 micrometers (μm).

10. The method according to claim 1, wherein the recessed uneven surface has a shape of dimples, and each dimple has a depth and a width having a ratio of about 1 to 10 to about 1 to 30.

11. The method according to claim 1, further comprising forming a second insulating layer on the reflector.

12. The method according to claim 11, further comprising forming a pixel electrode on the second insulating layer, wherein the pixel electrode is electrically connected to the switching element.

13. The method according to claim 12, wherein the second insulating layer is formed of an inorganic material.

14. The method according to claim 12, wherein the second insulating layer is formed of an organic material.

15. The method according to claim 14, wherein the organic material is benzocyclobutene.

16. The method according to claim 1, wherein the forming a plurality of photoresist patterns is performed by using a mask.

17. The method according to claim 1, wherein the plurality of photoresist patterns have a cross-section of one of a polygon, a semi-circle, and a semi-ellipsoid.

18. The method according to claim 17, wherein the polygon is one of a pentagon, a hexagon, and a trapezoid.

* * * * *